(12) United States Patent
Rajagopalan et al.

(10) Patent No.: US 7,944,860 B2
(45) Date of Patent: May 17, 2011

(54) PREVENTING LOSS OF NETWORK TRAFFIC DUE TO INCONSISTENT CONFIGURATIONS WITHIN THE NETWORK

(75) Inventors: Santosh Rajagopalan, San Francisco, CA (US); Tameen Khan, Los Angeles, CA (US); Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 156 days.

(21) Appl. No.: 12/455,612

(22) Filed: Jun. 4, 2009

(65) Prior Publication Data

US 2010/0309820 A1      Dec. 9, 2010

(51) Int. Cl.
  *H04L 12/28* (2006.01)
  *H04L 12/56* (2006.01)
(52) U.S. Cl. ........................................ 370/256; 370/392
(58) Field of Classification Search .................. 370/230, 370/235, 254–256, 351, 389, 390, 392
  See application file for complete search history.

(56) References Cited

U.S. PATENT DOCUMENTS

| 6,937,576 B1* | 8/2005 | Di Benedetto et al. ....... 370/256 |
| 7,565,435 B2* | 7/2009 | Rouyer et al. ................ 709/227 |
| 7,609,655 B2* | 10/2009 | Rose ........................... 370/254 |
| 2005/0152289 A1* | 7/2005 | Nagata et al. ................ 370/256 |
| 2006/0198323 A1 | 9/2006 | Finn et al. |
| 2007/0242602 A1 | 10/2007 | Pang et al. |
| 2009/0022070 A1 | 1/2009 | Iovanna et al. |
| 2009/0219836 A1* | 9/2009 | Khan et al. .................. 370/256 |

FOREIGN PATENT DOCUMENTS

EP        1705839 A1        9/2006

OTHER PUBLICATIONS

Sharma et al, "Viking: A Multi-Spanning-Tree Ethernet Architecture for Metropolitan Area and Cluster Networks", INFOCOM 2004, 23rd Annual Joint Conference, Mar. 7, 2004.
Guillermo Ibanez et al., "Abridges as RBridges: Transparent Routing with Simplified Multiple Spanning Tree", draft-gibanez-trill-abridge-01.txt, Jun. 6, 2006.

* cited by examiner

*Primary Examiner* — Hong Cho
(74) *Attorney, Agent, or Firm* — Cindy Kaplan

(57) ABSTRACT

In one embodiment, a method includes receiving at a processor at a node, notification of an error in a VLAN to topology mapping at the node, receiving a multi-destination packet from the VLAN in the VLAN to topology mapping, the multi-destination packet including a tree identifier associated with one of the topologies, and transmitting the multi-destination packet to all forwarding ports at the node in an unpruned tree corresponding to the tree identifier contained in the multi-destination packet. An apparatus is also disclosed.

20 Claims, 4 Drawing Sheets

PREVENTING LOSS OF NETWORK TRAFFIC DUE TO INCONSISTENT CONFIGURATIONS WITHIN THE NETWORK

BACKGROUND OF THE INVENTION

The present disclosure relates generally to communication networks, and more particularly, to preventing loss of network traffic due to inconsistent configurations within the network.

In multi-destination, multi-path capable Layer 2 (L2) networks, a set of virtual local area networks (VLANs) are mapped to a topology. Under normal operating conditions, the VLAN to topology mappings are consistent throughout the network. However, due to misconfiguration at a node or conflict between nodes while a configuration change propagates through the network, the VLAN to topology mappings may not be consistent throughout the network.

If a VLAN to topology configuration mismatch is present at one or more nodes in the network, multi-destination packets may be 'blackholed' in which case packets are dropped at the node or immediately downstream of the node, which results in loss of network traffic.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
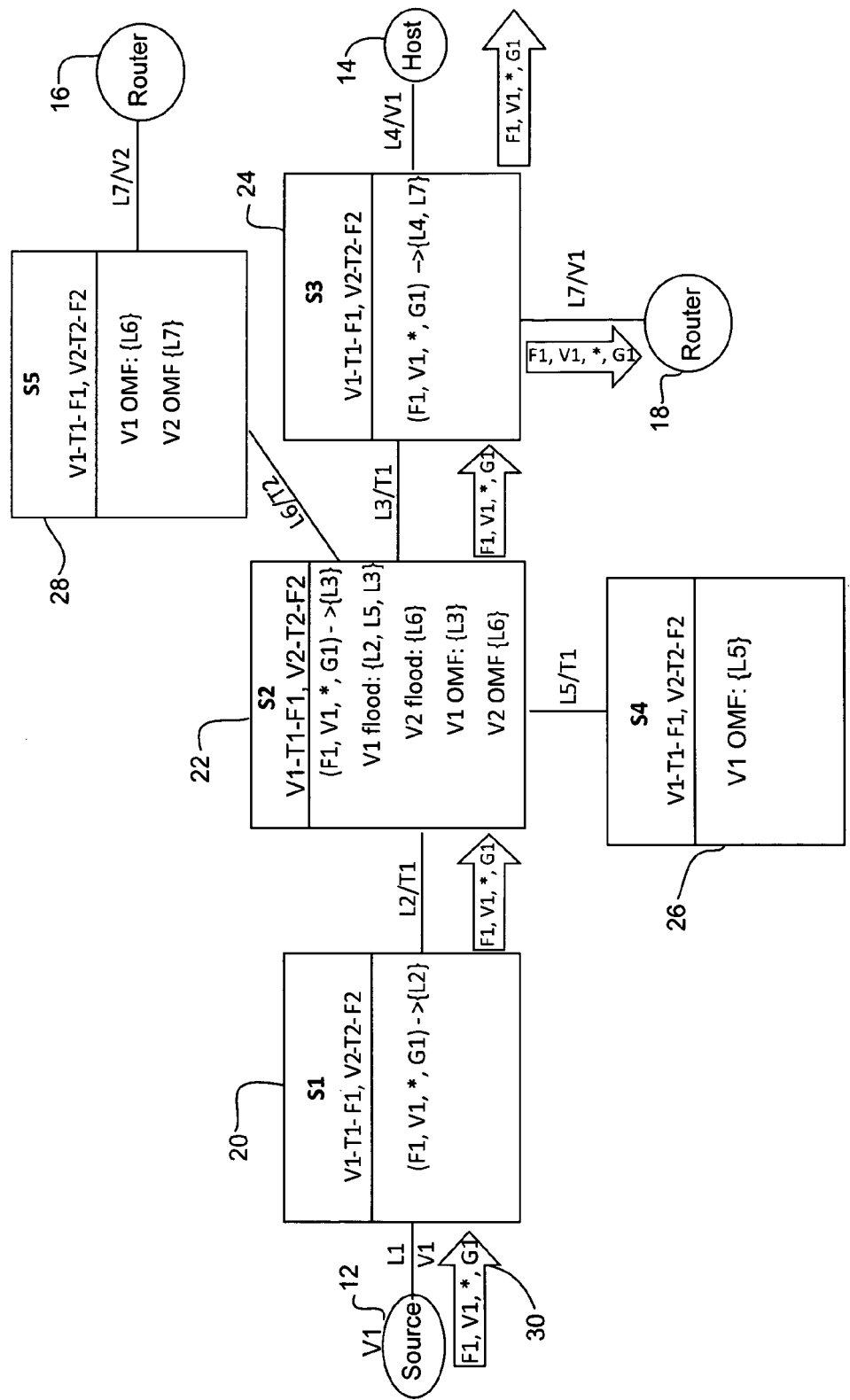
FIG. 1 illustrates an example of a network in which embodiments described herein may be implemented.

In one embodiment, a method generally comprises receiving at a processor at a node, notification of an error in a VLAN to topology mapping at the node, receiving a multi-destination packet from the VLAN in the VLAN to topology mapping, the packet including a tree identifier associated with one of the topologies, and transmitting the packet to all forwarding ports at the node in an unpruned tree corresponding to the tree identifier contained in the packet.

In another embodiment, an apparatus generally comprises memory for storing VLAN to topology mappings, and a processor for receiving notification of an error in one of the VLAN to topology mappings, processing a multi-destination packet received from the VLAN in the VLAN to topology mapping identified with an error, the packet comprising a tree identifier associated with one of the topologies, and transmitting the packet to all forwarding ports at the apparatus in an unpruned tree corresponding to the tree identifier contained in the packet.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, features relating to technical material that is known in the technical fields related to the invention have not been described in detail.

In multi-destination, multi-path capable Layer 2 (L2) networks such as DCE (Data Center Ethernet) and TRILL (Transparent Interconnection of Lots of Links), a set of VLANs (Virtual Local Area Networks) are mapped to a topology. It is possible for inconsistencies in the VLAN to topology mappings to occur in the network. The VLAN to topology mapping mismatch may be due to misconfiguration at a node or the mismatch may be present temporarily at one or more nodes as a topology change propagates through the network. If the VLAN to topology mapping is not consistent throughout the network, packets may be blackholed, resulting in loss of network traffic.

One option for handling errors in VLAN to topology mappings is to change the VLAN in which errors are present to a 'base' topology. A drawback to this method is the complexity involved in changing to the base topology and the disruption to traffic on the entire network, even if only a single node is misconfigured.

The embodiments described herein allow packets to be transmitted from a node with a misconfigured VLAN to topology mapping to their correct destination, thereby preventing blackholing of packets. The embodiments provide a correction for VLAN to topology mapping inconsistencies without the use of VLAN congruency enforcement mechanisms.

Referring now to the drawings, and first to FIG. 1, an example of a network in which embodiments described herein may be implemented is shown. The embodiments described herein operate in the context of a data communication network including multiple network devices (nodes). Some of the nodes in a network that employs the embodiments may be switches, bridges, gateways, routers, or other network devices. The network device may include, for example, a master central processing unit (CPU), memory, interfaces, and a bus. In one embodiment, the network device is implemented on a general purpose network machine as described below with respect to FIG. 4.

The network shown in FIG. 1 includes a source 12, host 14, routers 16, 18 and switches S1 (20), S2 (22), S3 (24), S4 (26), and S5 (28). The nodes are connected by links as follows: source 12 is connected to node 20 via link L1, node 20 is connected to node 22 via link L2, node 22 is connected node 24 via link L3, node 26 via link L5, and node 28 via link L6, node 28 is connected to router 16 via link L7, and node 24 is connected to host 14 via link L4 and router 18 via link L7. The network includes a plurality of VLANs (VLAN V1 and VLAN V2) and a plurality of topologies (topology T1 and topology T2). Each VLAN is mapped to a topology. In the example shown in FIG. 1, VLAN V1 is mapped to topology T1 and VLAN V2 is mapped to topology T2.

The links also represent trees ("graph"), which are identified by a tree-id (F1, F2). The tree-id may be, for example, an ftag (forwarding tag) for use with DCE or an rbridge (routing bridge) for use with TRILL. In FIG. 1, F1 is the tree identifier associated with topology T1 and F2 is the tree identifier associated with topology T2. The tree-id to topology mapping as well as the base graph information is assumed to be consistent throughout the network.

It is to be understood that the network shown in FIG. 1 and described herein is only one example and that the embodiments may be implemented in different types of networks having any number or type of network devices.

The nodes 20, 22, 24, 26, 28 are preferably configured with an enforcement mechanism that ensures the packets following a tree do not 'leak' onto links which are not part of the tree. In DCE networks, this may be performed utilizing Incoming Interface Check (IIC), Color Blocking Logic (CBL), or a combination thereof. CBL (ftag CBL) refers to the enforcement mechanism used to ensure that a packet that is associated with a particular tree-ID is only allowed to ingress or egress on ports that have been determined to be in the forwarding state for that particular tree-ID. This determination may be done in the Layer 2 networks by ISIS or other routing protocol, and involves computation of a shortest path tree that covers all of the nodes in a network. The links which are part of the shortest path tree are considered to be in the "forwarding state" for that particular tree-ID. IIC is a further refinement of CBL. Whereas CBL only ensures that packets are following the tree and do not leak onto links which are not part of the tree, IIC uses the shortest path tree computed by the Layer 2 routing protocol to restrict packets with a particular tree-ID from a particular source to ingress a single link on the switch. In other words, IIC ensures that on a particular tree, packets from a particular source only ingress on a particular link on a switch.

Each switch in FIG. 1 is configured with a VLAN to topology mapping; V1-T1-F1, V2-T2-F2. In the example shown in FIG. 1, all VLAN to topology mappings are correctly configured on all switches and consistent throughout the network. The following describes transmittal of a multi-destination packet through the network under normal operating conditions (i.e., no misconfigured or inconsistent VLAN to topology mappings).

In the example shown in FIG. 1, a multi-destination packet 30 is transmitted from source 12 on VLAN V1 to multicast group G1. The source 12 tags the packet with the correct tree-id according to the specified VLAN to topology mapping. The packet 30 is then transmitted on tree F1 to node 20 via link L1. Node 20 is configured with VLAN to topology mappings (V1-T1-F1, V2-T2-F2). A forwarding lookup is performed (e.g., in a MAC forwarding table) for the received packet 30 at node 20 and a hit is found; (F1, V1, *G1)->L2. The packet 30 is then forwarded from node 20 to node 22 on link L2. A lookup is performed at node 22 and a hit is found; (F1, V1, *, G1)->L3. Node 22 transmits the packet to node 24 via link L3. A lookup at node 24 identifies the paths on link L4 to host 14 and link L7 to router 18. The packet 30 thus follows the pruned multicast tree F1 to reach its destinations.

If the embodiments described herein are not implemented, in the case of an error in the VLAN to topology mapping at a node, traffic is likely to be blackholed and therefore not reach its destination. The following describes how this occurs.

A (vlan, group) membership list comprises local group members and remote switches which have members connected thereto. A path to remote switches in each tree (identified by tree-id) is resolved in the topology that the VLAN belongs. Resolving the route to a switch on a tree provides an interface to be used on that tree to reach the remote switch. This interface is then added to the outgoing interface list for that (vlan, tree-id, group). Forwarding table entries are qualified by (VLAN, ftag, source, group). However, in the case of a mismatch in VLAN to topology mapping, the tree-id used in the forwarding table entries is different from the tree-id used in the incoming packets. This is because the VLAN to topology to tree-id mapping is out of sync.

A forwarding lookup performed on (vlan, tree-id, group) at a misconfigured node results in a miss since the entry has the wrong (vlan, tree-id) combination. A miss typically results in the packet being transmitted to the router ports or along the flood-to-vlan ports. These per VLAN port lists are also computed based on a set of assumptions about the VLAN to topology to tree-id mapping. As a result of the lookup, the packet is transmitted towards ports which belong to a set of trees in the wrong topology.

For example, node 22 may be misconfigured with V2-T1-F1, V1-T2-F2 mappings. In this case, node 22 thinks that V1 is in a different topology T2 which contains a tree-ID of F2. The entries in the forwarding tables contain a key of (F2, V1, G1). A multi-destination packet which is labeled with the correct tree-id F1 and VLAN V1 will therefore result in a miss in the forwarding table. The multi-destination packet is then sent to an Optimized Multicast Flood (OMF) at link L6 or flooded to VLAN (depending on configuration and packet type). Link L3 is not part of the flood or OMF, thus the packet does not reach its destination at host 14 or router 18. A tree enforcement mechanism (e.g., ftag CBL) prevents the packets from being transmitted out of the wrong ports and a tree enforcement mechanism (e.g., IIC) at the neighboring switch ensures that traffic is not accepted coming in on the wrong port. For example, an egress CBL check at node 22 will drop the packet based on the tree-id or next hop IIC at node 28 will drop the packet. Thus, the traffic gets blackholed.

The embodiments described herein prevent blackholing of multi-destination packets by modifying the forwarding rules upon identification of a mismatch in the VLAN to topology mapping between a node and its neighbor nodes.

In one embodiment, the error in VLAN to topology mapping is detected using ISIS (Intermediate System to Intermediate System). However, other methods may be used to detect a misconfigured node or inconsistencies within the network.

On the node at which the error in VLAN to topology mapping is identified, the following changes are made to the forwarding rules:

1) Any lookups which use a key of (tree-id=*, VLAN, group), wherein '*' denotes a wildcard key, is disabled. This may be done by deleting or modifying the entries. Only those entries corresponding to the VLAN which is in conflict are disabled.
2) When there is a miss on the forwarding table (failed lookup), the packet is sent to all of the forwarding ports in the unpruned tree corresponding to the tree-id contained in the packet. This is done instead of the usual router port or flood-to-VLAN based forwarding.

The node is preferably configured so that it does not perform a flood or OMF lookup on a MAC table miss for packets on the VLAN identified with an error in its VLAN to topology mapping.

In step 2) above, the packet may be sent to the unpruned tree by performing a flood-to-fabric and relying on egress drop or by performing an ingress lookup to the tree-id, as described below, for example.

In one embodiment, step 2) may be achieved by sending the packet towards all of the edge ports and all of the core ports in a Virtual Device Context (VDC) and then relying on the tree-id-based CBL and VLAN-based CBL to allow the packet to only go out through the unpruned tree. This may be accomplished by replacing the flood for the relevant VLAN with an entry that includes all of the edge ports on that VLAN and all core ports in the VDC. Thus, at the egress of the switch, packets with a tree-id only go out through ports marked as forwarding for that tree-id/VLAN. This is ensured by the ftag CBL.

In an alternative embodiment, a dedicated per tree-id list is used at the ingress to decide which ports the packets are transmitted. This would include all of the edge ports and only the core ports in that tree-id's topology. In one example, a lookup may be performed in a table indexed by (tree-id, VDC) and which provides all of the edge ports and only those core ports which are part of the topology that the tree-id belongs. This adds a table at the ingress, but has the benefit of reducing switch fabric usage.

At next hop switches that are part of the pruned multicast tree, forwarding proceeds as usual. At a next hop switch which is not part of the pruned tree, a forwarding lookup results in a miss and the router port list is then used. The router port list for that tree-id directs the packet back to the node it came from, but it is prevented from going out of the wire because of self-forwarding checks.

Figure 2:
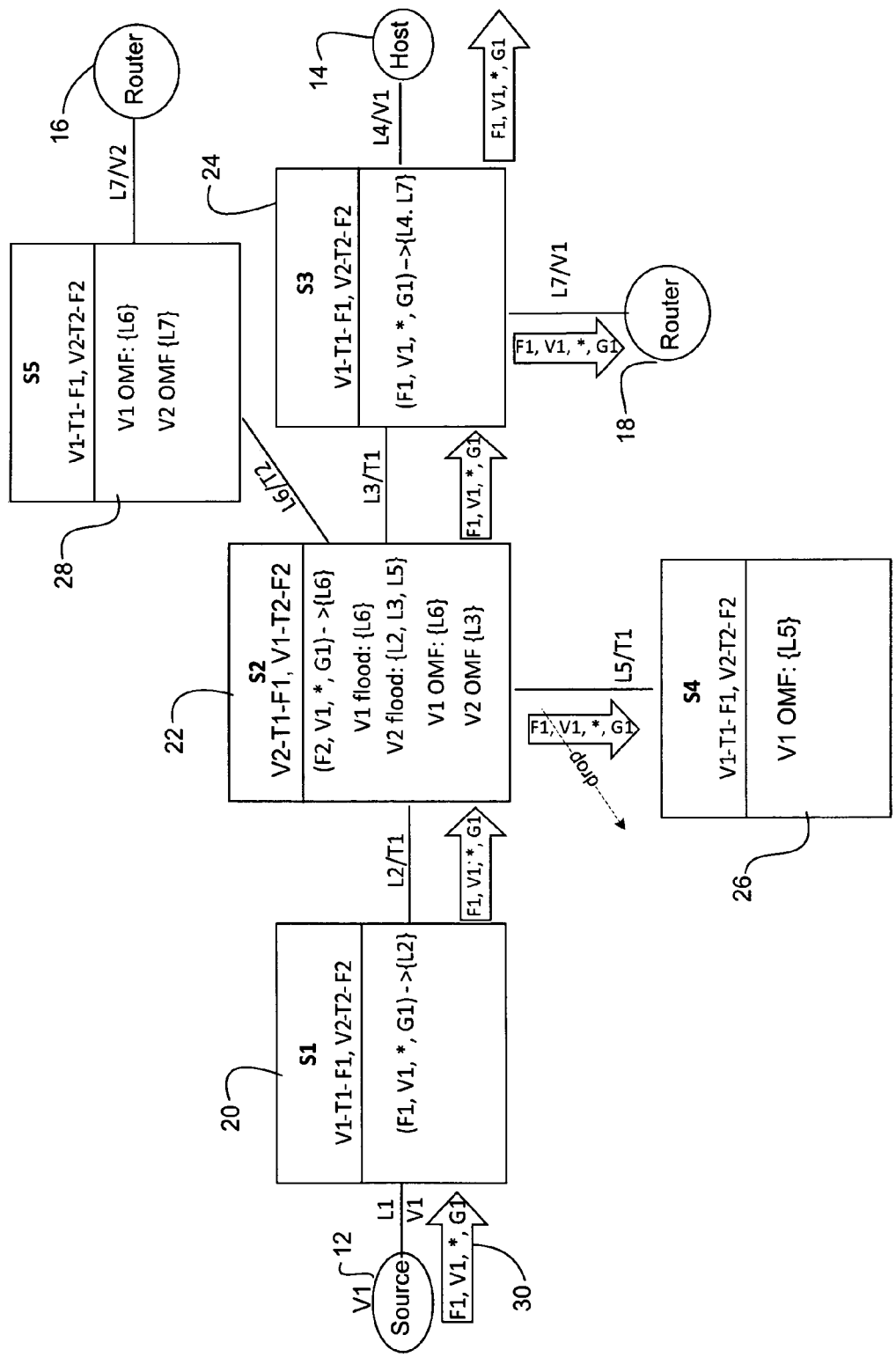
FIG. 2 illustrates the network of FIG. 1 with a misconfigured VLAN to topology mapping at one of the nodes in the network.

FIG. 2 illustrates the network of FIG. 1 with a misconfigured VLAN to topology mapping at node 22. The multi-destination packet 30 is transmitted from the source 12 through node 20 to node 22, as previously described with respect to FIG. 1. A VLAN to topology error is identified at node 22. The forwarding rules are modified as described above so that the packet is transmitted to all forwarding ports at node 22 corresponding to an unpruned multicast tree with the tree identifier specified in packet 30. The process performed at node 22 is described below with respect to the FIG. 3.

Figure 3:
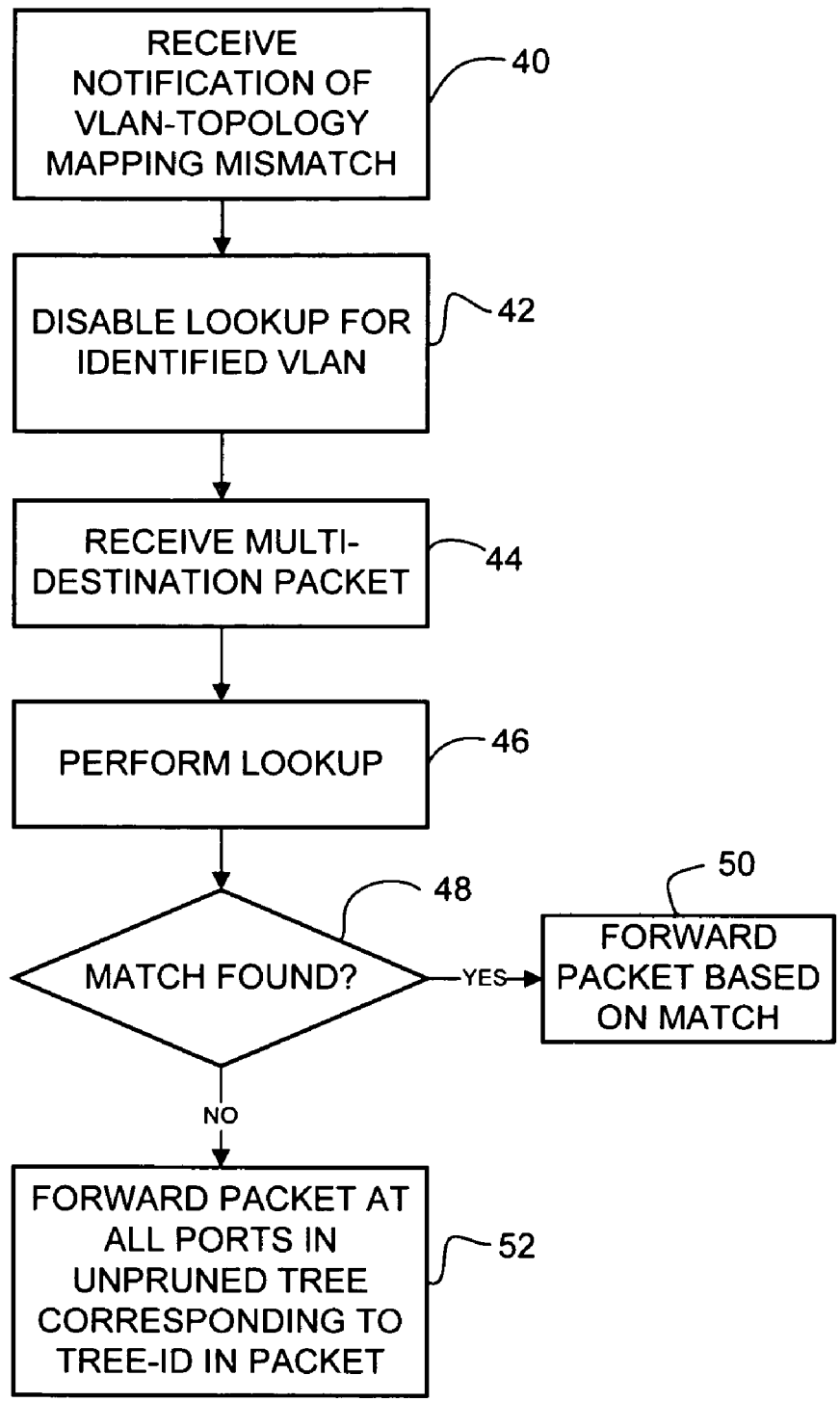
FIG. 3 is a flowchart illustrating a process for preventing loss of network traffic due to a misconfigured VLAN to topology mapping.

FIG. 3 is a flowchart illustrating a process for preventing loss of multicast traffic due to a misconfigured VLAN to topology mapping at a node in a network (e.g., node 22 in FIG. 2). At step 40, the node 22 receives notification of an error in a VLAN to topology mapping at the node. The node 22 disables one or more lookup entries in a forwarding table corresponding to the VLAN for which a VLAN to topology mismatch was identified (step 42). At step 44 the node receives a multi-destination packet 30. A lookup in the forwarding table is performed (step 46). If a match is found (step 48), the packet is forwarded according to the normal operation forwarding rules (e.g., operation illustrated in FIG. 1) (step 50). If the packet was transmitted on the VLAN for which an error was identified, a match is not found (failed lookup) since these VLAN entries were disabled at step 42. At step 52, the packet is transmitted to all forwarding ports at the node corresponding to an unpruned multicast tree with the tree identifier contained in the packet. For example, the packet is forwarded from ports at node 22 connected to links L3 and L5, which are on the path of the unpruned tree for F1 (FIG. 2). The packet may be checked at the egress port (e.g., CBL check) or next hop node (e.g., IIC). As shown in FIG. 2, packets will be dropped due to the self forwarding check performed when the node 22 attempts to transmit the packet at link L5, which is part of unpruned tree F1.

It is to be understood that the process described above is only one example and that steps may be added or removed or the steps may be reordered or combined, without departing from the scope of the invention. For example, steps 42, 46, 48, and 50 may be deleted and the forwarding rules configured to automatically perform step 52 upon receiving a packet on the VLAN identified as having a VLAN to topology mapping error. Packets received on other VLANs (with properly configured VLAN to topology mappings) are forwarded using the conventional lookup process.

Figure 4:
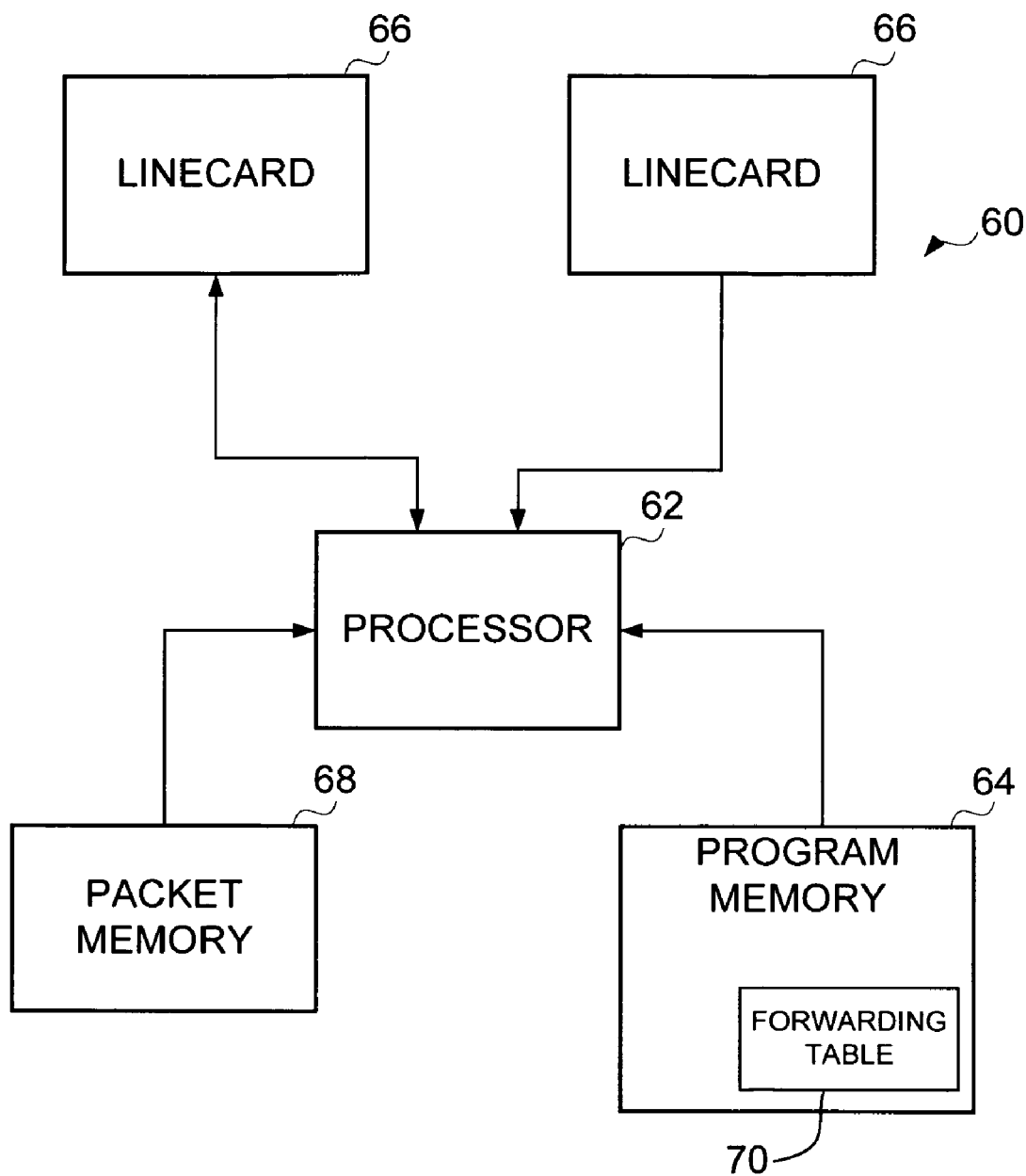
FIG. 4 depicts an example of a network device useful in implementing embodiments described herein.

FIG. 4 depicts a network device 60 that may be used to implement embodiments described herein. Network device 60 is configured to implement all of the network protocols and extensions thereof described above. In one embodiment, network device 60 is a programmable machine that may be implemented in hardware, software, or any combination thereof. Logic may be encoded in one or more tangible media for execution by a processor. For example, processor 62 may execute codes stored in a program memory 64. Program memory 64 is one example of a computer-readable medium. Program memory 64 can be a volatile memory. Another form of computer-readable medium storing the same codes is a type of non-volatile storage such as floppy disks, CD-ROMs, DVD-ROMs, hard disks, flash memory, etc. Memory 64 may also include one or more forwarding tables (e.g., MAC table) 70 used in performing a lookup for a received packet.

Network device 60 interfaces with physical media via a plurality of linecards 66. Linecards 66 may incorporate Ethernet interfaces, DSL interfaces, Gigabit Ethernet interfaces, 10-Gigabit Ethernet interfaces, SONET interfaces, etc. As packets are received, processed, and forwarded by network device 60, they may be stored in a packet memory 68. To implement functionality according to the system, linecards 66 may incorporate processing and memory resources similar to those discussed above in connection with the network device as a whole. It is to be understood that the network device 60 shown in FIG. 4 and described above is only one example and that different configurations of network devices may be used.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for operating a node in a network comprising a plurality of Virtual Local Area Networks (VLANs) and a plurality of topologies, the method comprising:
   receiving at a processor at the node, notification of an error in a VLAN to topology mapping at the node;
   receiving at the node, a multi-destination packet from the VLAN in said VLAN to topology mapping, the multi-destination packet comprising a tree identifier associated with one of said topologies; and
   transmitting the multi-destination packet to all forwarding ports at the node in an unpruned tree corresponding to said tree identifier contained in the multi-destination packet.

2. The method of claim 1 further comprising disabling a lookup entry in a forwarding table for the VLAN in said VLAN to topology mapping upon receiving said notification of said error and wherein transmitting the multi-destination packet comprises transmitting the packet in response to a failed lookup in the forwarding table.

3. The method of claim 2 further comprising receiving a packet from one of said VLANs not in said VLAN to topology mapping, finding a match in a lookup in the forwarding table, and forwarding the packet based on said match.

4. The method of claim 1 wherein transmitting the multi-destination packet comprises transmitting the packet to all edge ports and all core ports in a Virtual Device Context at the node.

5. The method of claim 4 further comprising performing a tree enforcement check at one or more of the ports of the node.

6. The method of claim 1 wherein transmitting the multi-destination packet comprises transmitting the packet to all edge ports and only core ports corresponding to said tree identifier contained in the packet.

7. The method of claim 6 further comprising performing a lookup in a table indexed by said tree identifier to identify said core ports on which to transmit the multi-destination packet.

8. An apparatus for use in a network comprising a plurality of Virtual Local Area Networks (VLANs) and a plurality of topologies, the apparatus comprising:
   memory for storing VLAN to topology mappings; and
   a processor for receiving notification of an error in one of said VLAN to topology mappings, processing a multi-destination packet received from the VLAN in said VLAN to topology mapping identified with said error, the multi-destination packet comprising a tree identifier associated with one of said topologies, and transmitting the multi-destination packet to all forwarding ports at the apparatus in an unpruned tree corresponding to said tree identifier contained in the multi-destination packet.

9. The apparatus of claim 8 further comprising a forwarding table and wherein said processor is configured to disable a lookup entry in the forwarding table for the VLAN in said VLAN to topology mapping identified with said error and wherein the multi-destination packet is transmitted in response to a failed lookup in the forwarding table.

10. The apparatus of claim 9 wherein the processor is configured for forwarding a packet received from one of said VLANs not in said VLAN to topology mapping identified with said error, based on a match found in a lookup in the forwarding table.

11. The apparatus of claim 8 wherein the multi-destination packet is transmitted to all edge ports and all core ports in a Virtual Device Context at the apparatus.

12. The apparatus of claim 11 further comprising a tree enforcement mechanism configured to perform a tree enforcement check at one or more of the ports of the apparatus.

13. The apparatus of claim 8 wherein the multi-destination packet is transmitted to all edge ports and only core ports corresponding to said tree identifier contained in the packet.

14. The apparatus of claim 13 wherein the processor is configured to perform a lookup in a table indexed by said tree identifier to identify said core ports on which to transmit the multi-destination packet.

15. An apparatus for use in a network comprising a plurality of Virtual Local Area Networks (VLANs) and a plurality of topologies, the apparatus comprising:
   memory for storing VLAN to topology mappings;
   means for processing a notification of an error in one of said VLAN to topology mappings;
   means for processing a multi-destination packet received from the VLAN in said VLAN to topology mapping identified with said error, the multi-destination packet comprising a tree identifier associated with one of said topologies; and
   means for transmitting the multi-destination packet to all forwarding ports at the apparatus in an unpruned tree corresponding to said tree identifier contained in the multi-destination packet.

16. The apparatus of claim 15 further comprising means for disabling a lookup entry in a forwarding table for the VLAN in said VLAN to topology mapping identified with said error and wherein means for transmitting the multi-destination packet comprises means for transmitting the packet in response to a failed lookup in the forwarding table.

17. The apparatus of claim 16 further comprising means for forwarding a packet received from one of said VLANs not in said VLAN to topology mapping identified with said error, based on a match found in a lookup in the forwarding table.

18. The apparatus of claim 15 wherein means for transmitting the multi-destination packet comprises means for transmitting the packet to all edge ports and all core ports in a Virtual Device Context at the apparatus.

19. The apparatus of claim 18 further comprising means for performing a tree enforcement check at one or more of the ports of the apparatus.

20. The apparatus of claim 15 wherein means for transmitting the multi-destination packet comprises means for transmitting the packet to all edge ports and only core ports corresponding to said tree identifier contained in the packet.

* * * * *